US008626928B2

(12) United States Patent  (10) Patent No.: US 8,626,928 B2
George et al.  (45) Date of Patent: Jan. 7, 2014

(54) DISASSOCIATING AND FREEING MANAGED CONNECTIONS BASED ON USAGE PATTERNS

(75) Inventors: Manu T. George, Bangalore (IN); Murali K. Surampalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 12/951,258

(22) Filed: Nov. 22, 2010

(65) Prior Publication Data

US 2012/0131160 A1  May 24, 2012

(51) Int. Cl.
*G06F 15/16* (2006.01)
(52) U.S. Cl.
USPC ........... 709/227; 709/232; 709/233; 370/230; 370/231; 370/412; 719/318
(58) Field of Classification Search
USPC ......... 709/232, 233, 234, 235, 225, 227, 226, 709/223; 719/318; 370/230, 231, 235, 412, 370/418, 428, 429
See application file for complete search history.

(56) References Cited

U.S. PATENT DOCUMENTS

| 6,434,543 | B1 | 8/2002 | Goldberg et al. | |
|---|---|---|---|---|
| 6,988,140 | B2 * | 1/2006 | Chintalapati et al. | 709/227 |
| 7,089,565 | B2 | 8/2006 | Kan et al. | |
| 7,136,925 | B1 | 11/2006 | Eerola | |
| 7,451,454 | B2 * | 11/2008 | Chen et al. | 719/318 |
| 2002/0198971 | A1 * | 12/2002 | Resnick et al. | 709/221 |
| 2008/0151767 | A1 | 6/2008 | Moran et al. | |
| 2008/0177873 | A1 * | 7/2008 | Ni et al. | 709/223 |
| 2009/0006627 | A1 * | 1/2009 | Castellucci et al. | 709/226 |

FOREIGN PATENT DOCUMENTS

| EP | 1351142 A2 | 10/2003 |
|---|---|---|
| WO | 0176175 A2 | 10/2001 |
| WO | 2004021125 A2 | 3/2004 |

OTHER PUBLICATIONS

"Oracle Containers for J2EE Resource Adapter Administrator's Guide," Sep. 2006, http://download.oracle.com/docs/cd/B31017_01/web.1013/b28956/trmgcont.htm.
"Database Connection Management," http://help.sap.com/saphelp_nw72/helpdata/en/49/2adfdb5d561907e10000000a42189c/content.htm.

* cited by examiner

*Primary Examiner* — Ian N Moore
*Assistant Examiner* — Hien Nguyen
(74) *Attorney, Agent, or Firm* — Robert A. Voigt, Jr.; Winstead, P.C.

(57) ABSTRACT

A method, system and computer program product for disassociating and freeing managed connection objects. Managed connections are dissociated from their connection handles based on their usage patterns, determined by various connection parameters, which more effectively reduces the idle time of the managed connections. The managed connections whose cost of disassociating and reassociating is less than the cost of keeping the managed connections idle are targeted and released to the free pool of managed connections via the dissociation from its connection handles.

21 Claims, 6 Drawing Sheets

DISASSOCIATING AND FREEING MANAGED CONNECTIONS BASED ON USAGE PATTERNS

TECHNICAL FIELD

The present invention relates to the J2EE Connector Architecture (JCA), and more particularly to disassociating and freeing managed connection objects to a pool of available managed connection objects based on usage patterns.

BACKGROUND

The Java 2 Platform, Enterprise Edition (J2EE) is a software standard for developing multitier enterprise applications. The J2EE architecture has a client tier, middle tier, and back-end tier. The client tier supports a variety of client types, and the middle tier supports client services and business logic through web and Enterprise Java Beans (EJB) containers in the middle tier. The back-end tier includes the Enterprise Information Systems (EIS) in the EIS tier and many standard Application Programming Interfaces (APIs) for accessing databases. An Enterprise Information System is generally any kind of computing system that offers high quality of service, deals with large volumes of data and capable of supporting some large organization ("an enterprise"). One of skill in the art can accordingly alter the objects and components resident on the several tiers. "Containers" are standardized runtime environments that provide services to components on the platform. All containers provide runtime support for responding to client requests and returning results to clients. The containers also provide APIs to support user session management.

Resident within the J2EE architecture is a "resource adapter" that plays a central role in the integration and connectivity between an EIS and an application server (software framework dedicated to the efficient execution of procedures for supporting the construction of applications) and serves as the point of contact between application components, application servers and enterprise information systems. A resource adapter and other components, must communicate with one another based on a standard referred to as the J2EE Connector Architecture (JCA). To enable seamless integration with an application server, the resource adapter abides by system-level "contracts" defined by the JCA. These contracts exist between the application server and the EIS, and are implemented through the resource adapter. The contracts specify how a system external to the J2EE platform integrates with it by supporting basic functions handled by the J2EE container. There are three major contracts: the "connection management contract" which allows applications to connect to an EIS, and enables the application server to utilize pooling; the "transaction management contract" which allows an application server to manage and perform transactional access across one to many EIS resource managers; and the "security contract" which provides support for secure access to the EIS.

On a J2EE platform, a "ManagedConnection" interface provides an application-level connection handle from the EIS to the resource adapter's ManagedConnection instance. The ManagedConnection instance represents a physical connection to the underlying EIS. A connection handle to the ManagedConnection instance is created for the application that requests a physical connection represented by the ManagedConnection instance. This connection handle is used by the application code to refer to the underlying physical connection. The ManagedConnection instance is associated with the connection handle until the connection handle is closed and the associated transaction (e.g., loading personalized data from a database) is terminated.

In certain situations, the transaction may take a considerable amount of time to complete. In such cases, the ManagedConnection object is idle without being actively engaged in any sort of work.

Attempts have been made to reduce or eliminate these idle times by disassociating the ManagedConnection object from its connection handles when the processing is completed regardless of whether the transaction is completed or not. For example, when a portal application acquires a connection to load all personalization data from a database, the ManagedConnection object would be disassociated from its connection handles for this connection when the processing is completed. However, the time it takes to process the data may be significantly greater than the time it takes to load the data thereby causing the ManagedConnection object to be idle for a significant period of time.

As a result, there are cases where the connection resources, such as the ManagedConnection object, are being underutilized.

BRIEF SUMMARY

In one embodiment of the present invention, a method for disassociating and freeing managed connection objects comprising determining an amount of time a managed connection has been idled. The method further comprises determining an average amount of time that the managed connection is in an idle state. Additionally, the method comprises computing a standard deviation of a number of accesses to a physical connection represented by the managed connection over a time the managed connection has been idled. In addition, the method comprises disassociating, by a connection manager of an application server whose instructions are executed by a processor, the managed connection from a connection handle in response to the amount of time the managed connection has been idled being less than or greater than the standard deviation from the average time the managed connection is in the idle state and in response to the amount of time the managed connection has been idled being greater than the average time the managed connection is in the idle state, where the connection handle is used by an application to refer to the physical connection represented by the managed connection.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for disassociating and freeing managed connection objects. In one embodiment of the present invention, managed connections are dissociated from their connection handles based on their usage patterns, determined by various connection parameters, which more effectively reduces the idle time of the managed connections. The managed connections whose cost of disassociating and reassociating is less than the cost of keeping the managed connections idle are targeted and released to the free pool of managed connections via the dissociation from its connection handles.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
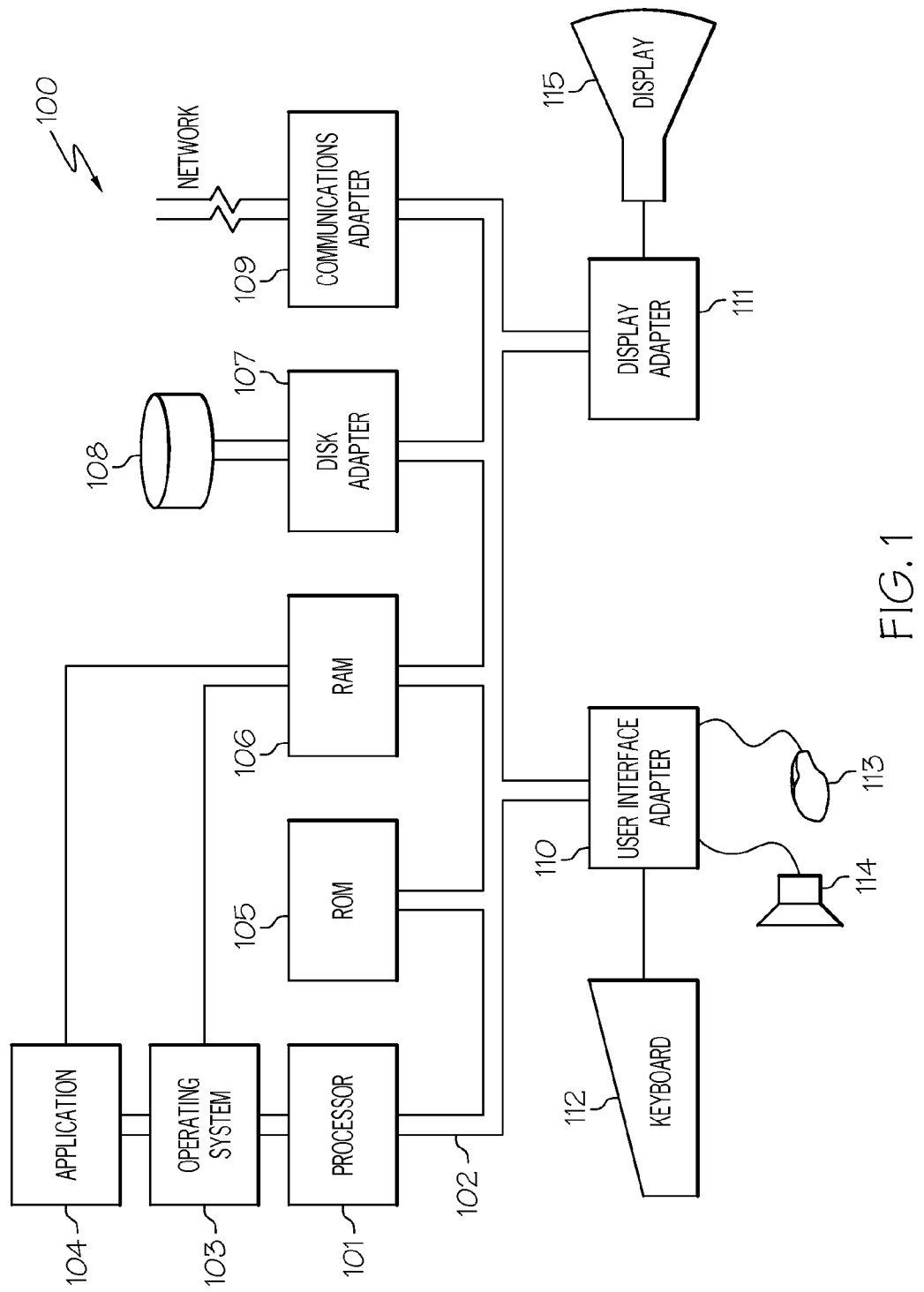
FIG. 1 is a hardware configuration of a computer system configured in accordance with an embodiment of the present invention.

Referring now to the Figures in detail, FIG. 1 illustrates an embodiment of a hardware configuration of a computer system 100 which is representative of a hardware environment for practicing the present invention. Referring to FIG. 1, computer system 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a user application that requests a physical connection represented by the managed connection object (e.g., ManagedConnection instance defined in the J2EE platform). Application 104 may also include the software components used for disassociating and freeing managed connection objects ("managed connects") based on their usage patterns, as discussed further below in association with FIGS. 2, 3A-3C and 4.

Referring again to FIG. 1, read-only memory ("ROM") 105 may be coupled to system bus 102 and include a basic input/output system ("BIOS") that controls certain basic functions of computer device 100. Random access memory ("RAM") 106 and disk adapter 107 may also be coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the applications of application 104 as discussed further below in association with FIGS. 2, 3A-3C and 4, may reside in disk unit 108 or in application 104.

Computer system 100 may further include a communications adapter 109 coupled to bus 102. Communications adapter 109 may interconnect bus 102 with an outside network (not shown) thereby allowing computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, there are cases where the connection resources, such as the managed connection object (e.g., ManagedConnection instance defined on a J2EE platform), are being underutilized. For example, the managed connection object is being idled without being actively engaged in any sort of work.

Figure 2:
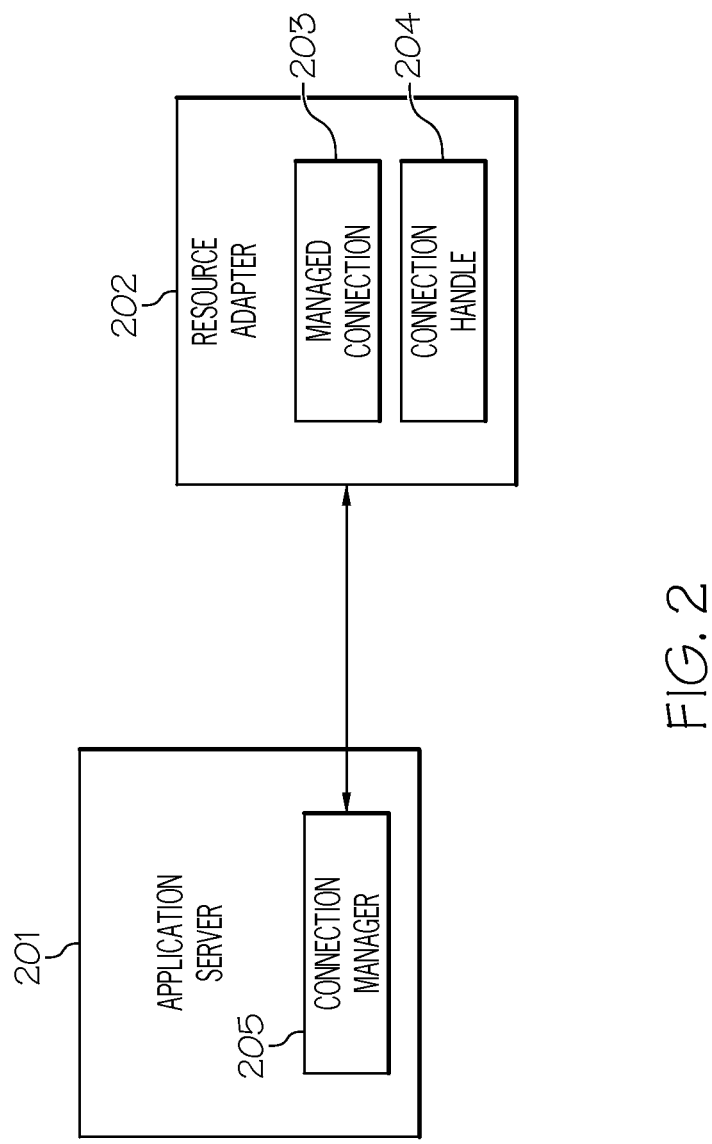
FIG. 2 is a diagram of the software components used in the technique for disassociating and freeing managed connection objects based on their usage patterns in accordance with an embodiment of the present invention.
Figure 3A:
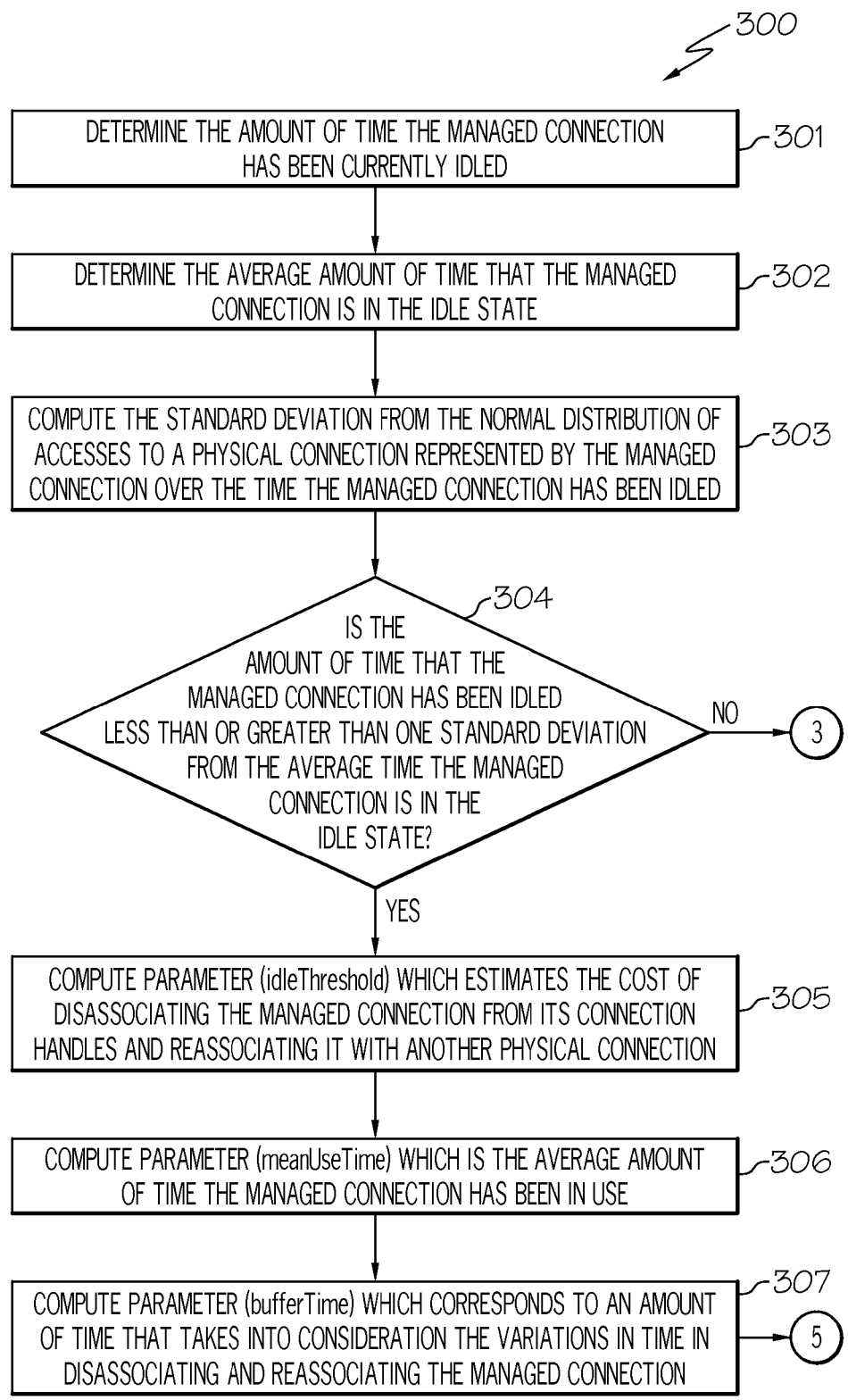
FIGS. 3A-3C are a flowchart of a method for disassociating and freeing managed connection objects based on their usage patterns in accordance with an embodiment of the present invention.
Figure 3B:
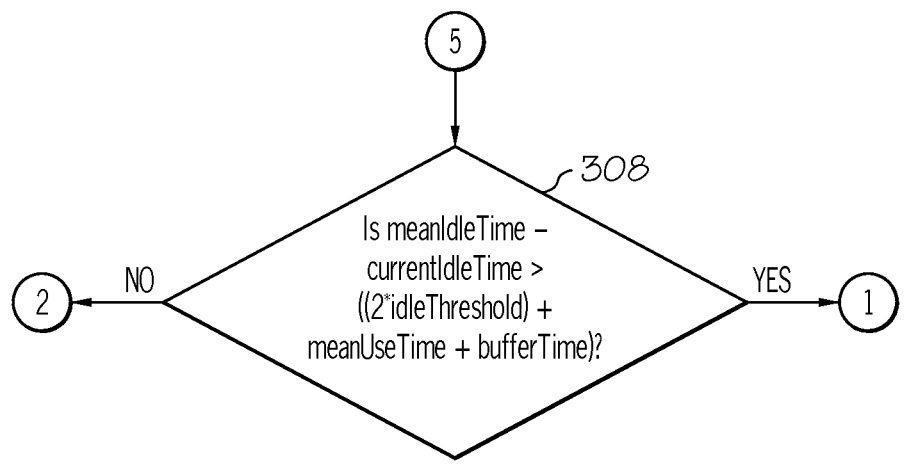
Figure 3C:
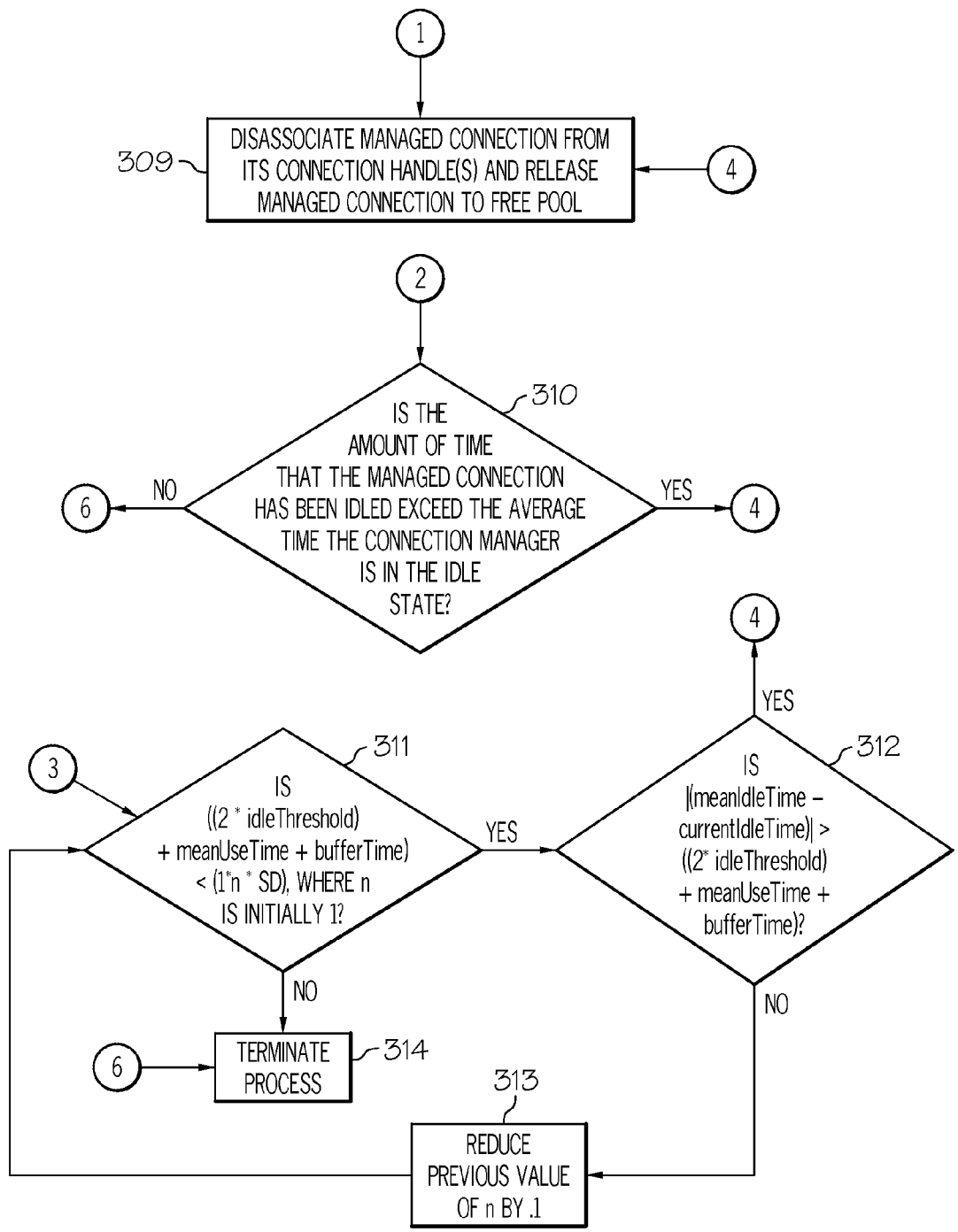
Figure 4:
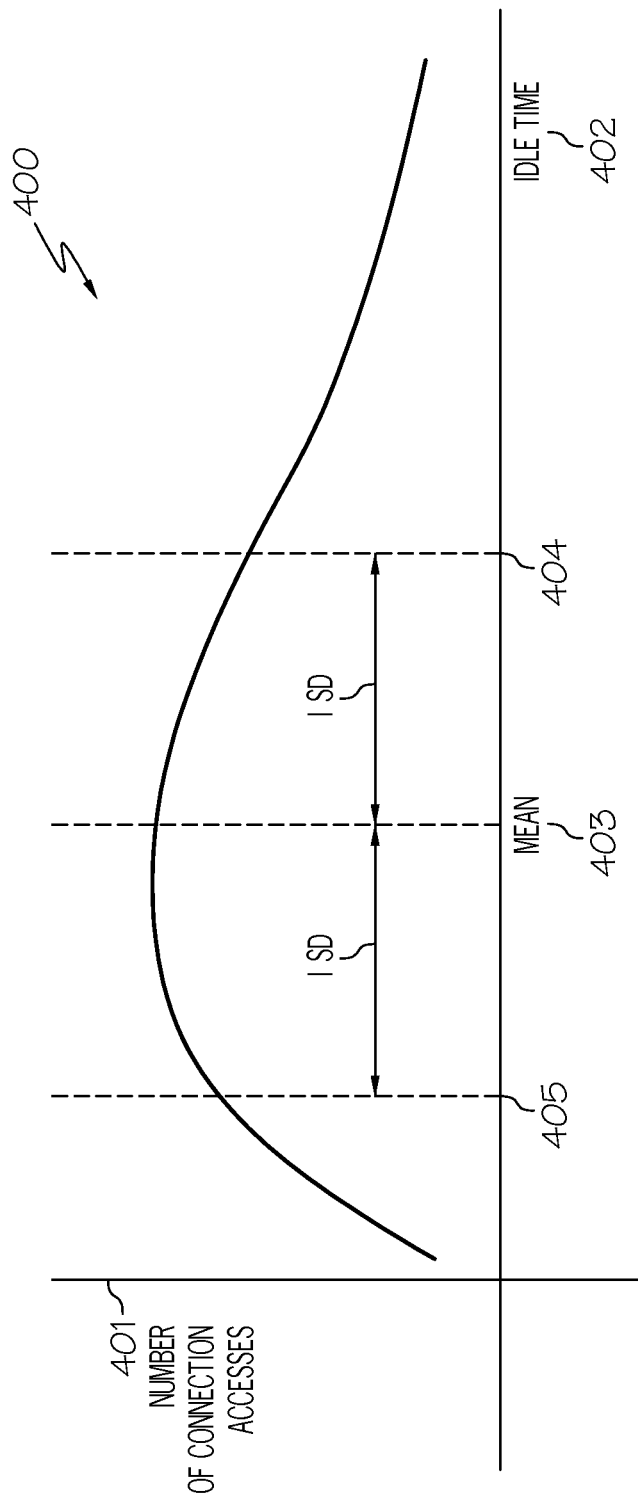
FIG. 4 is a graph illustrating the normal distribution of the number of accesses to the physical connection represented by the managed connection over the time that the managed connection has been idled in accordance with an embodiment of the present invention.

The principles of the present invention provide a technique for dissociating and freeing the managed connections from their connection handles based on their usage patterns thereby more effectively reducing or eliminating these idle times as discussed below in connection with FIGS. 2, 3A-3C and 4. FIG. 2 is a diagram of the software components used in the technique for disassociating and freeing managed connection objects ("managed connections") based on their usage patterns. FIGS. 3A-3C are a flowchart of a method for disassociating and freeing managed connection objects based on their usage patterns. FIG. 4 is a graph illustrating an example of the normal distribution of the number of accesses to the physical connection represented by the managed connection over the time that the managed connection has been idled.

Referring to FIG. 2, as stated above, FIG. 2 is a diagram of the software components used in the technique for disassociating and freeing managed connection objects based on their usage patterns in accordance with an embodiment of the present invention. In one embodiment, these software components may reside in application 104 (FIG. 1).

The software components include an application server 201 interacting with a resource adapter 202. In one embodiment, application server 201 is a software framework dedicated to the efficient execution of procedures for supporting the construction of applications. In one embodiment, resource adapter 202 plays a central role in the integration and connectivity between application server 201 and an Enterprise Information System (EIS) (not shown).

Resource adapter 202 includes a managed connection objection "managed connection" 203 within the J2EE architecture that represents a physical connection to the underlying EIS. Resource adapter 202 further includes one or more connection handles, such as connection handle 204, which is created for a user application that requests a physical connection represented by managed connection 203.

Application server 201 includes a connection manager 205 configured to disassociate managed connection 203 from its connection handles 204 based on the usage of managed connection 203 and freeing the disassociated managed connection 203 to a pool of available managed connections 203 ("connection pool"). Once in the pool of managed connections 203, the disassociated managed connection 203 can be reused to represent another physical connection to the underlying EIS. In this manner, managed connection 203 may be used to represent another physical connection to the underlying EIS rather than being idled.

The process in connection manager 205 disassociating managed connection 203 from its connection handles 204 thereby reducing or eliminating its idle time is discussed below in connection with FIGS. 3A-3C. FIGS. 3A-3C are a flowchart of a method 300 for disassociating and freeing managed connection objects ("managed connections") based on their usage patterns in accordance with an embodiment of the present. While the following discusses calculating various metrics (e.g., meanIdleTime, meanUseTime, dissociate time, reassociate time) per managed connection 203, these metrics may be calculated per connection pool.

Referring to FIG. 3A, in conjunction with FIGS. 1-2, in step 301, connection manager 205 determines the amount of time managed connection 203 has currently been idled.

In step 302, connection manager 205 determines the average amount of time that managed connection 203 is in the idle state.

In step 303, connection manager 205 computes the standard deviation from the normal distribution of accesses to a physical connection represented by managed connection 203 over the time managed connection 203 has been idled as illustrated in FIG. 4. Referring to FIG. 4, FIG. 4 is a graph 400 of the number of accesses to a physical connection (identified by 401) versus the time managed connection 203 has been idled ("idle time" 402). Graph 400 also illustrates the mean or average (identified by "mean" 403) of the number of accesses to a physical connection represented by managed connection 203 over the time managed connection 203 has been idled. Furthermore, graph 400 illustrates computing the standard deviation (identified by "SD") from the mean value 403. In particular, graph 400 shows the locations 404, 405 where the number of connection accesses to a physical connection is one standard deviation from mean 403. The information from graph 400 will be used in determining whether to disassociate managed connection 203 from its connection handles 204 as discussed below in connection with the remaining steps of method 300.

Returning to FIG. 3A, in conjunction with FIGS. 1, 2 and 4, in step 304, connection manager 205 determines if the amount of time that managed connection 203 has been idled is less than or greater than one standard deviation (points 404, 405 in graph 400) from the average time (point 403 in graph 400) managed connection 203 is in the idle state.

If the amount of time that managed connection 203 has been idled is less than or greater than one standard deviation (points 404, 405 in graph 400) from the average time (point 403 in graph 400) managed connection 203 is in the idle state, then, in step 305, connection manager 205 computes the parameter (idleThreshold) which estimates the cost of disassociating managed connection 203 from its connection handles 204 and reassociating it with another physical connection to the underlying EIS. By quantifying the cost of disassociating and reassociating managed connections 203, those managed connections 203 whose cost of disassociating and reassociating is less than the cost of keeping the managed connection 203 idle should be targeted and released to the free pool via dissociation from its connection handles 204 as discussed further below. In one embodiment, the parameter idleThreshold is equation to the following equation:

$$\text{idleThreshold}=2*(\text{average}(\text{dissociate time}+\text{reassociate time})), \tag{EQ1}$$

where the average dissociate time is the average time it takes to dissociate a managed connection 203 from its connection handles 204 and the average reassociate time is the average time it takes to reassociate the freed managed connection 203 to another physical connection to the underlying EIS.

In step 306, connection manager 205 computes the parameter (meanUseTime) which is the average amount of time that managed connection 203 is in use (engaged in work).

In step 307, connection manager 205 computes the parameter (bufferTime) which corresponds to an amount of time that takes into consideration the variations in time in disassociating and reassociating managed connection 203. In one embodiment, the parameter bufferTime is user selected.

Referring to FIG. 3B, in conjunction with FIGS. 1-2, in step 308, connection manager 205 determines if the following equation is satisfied:

$$\text{meanIdleTime}-\text{currentIdleTime}>((2*\text{idleThreshold})+\text{meanUseTime}+\text{bufferTime}), \tag{EQ 2}$$

where meanIdleTime corresponds to the average amount of time that managed connection 203 is in the idle state as discussed above in step 302, currentIdleTime corresponds to the amount of time managed connection 203 has been currently idled as discussed above in step 301.

Referring to FIG. 3C, if equation EQ2 is satisfied, then, in step 309, connection manager 205 disassociates managed connection 203 from its connection handles 204 and releases managed connection 203 to a free pool (i.e., a pool of managed connections 203 available to be used to represent another physical connection to the underlying EIS).

Alternatively, if equation EQ2 is not satisfied, then, in step 310, connection manager 205 determines if the amount of time that managed connection 203 has been idled exceeds the average time that connection manager 203 is in the idle state which is represented by the following equation:

$$\text{currentIdleTime}>\text{meanIdleTime} \tag{EQ3}$$

If equation EQ3 is satisfied, then, in step 309, connection manager 205 disassociates managed connection 203 from its connection handles 204 and releases managed connection 203 to a free pool (i.e., a pool of managed connections 203 available to be used to represent another physical connection to the underlying EIS).

If, however, equation EQ3 is not satisfied, then method 300 is terminated in step 314.

Referring to step 304 of FIG. 3A, if the amount of time that managed connection 203 has been idled is not less than or greater than one standard deviation from the average time managed connection 203 is in the idle state, then, in step 311 of FIG. 3C, connection manager 205 determines if the following equation is satisfied:

$$((2*\text{idleThreshold})+\text{meanUseTime}+\text{bufferTime})<(1*n*\text{SD}), \tag{EQ4}$$

where n is an integer that is initially set to equal 1.

If equation EQ4 is satisfied, then, in step 312, connection manager 205 determines if the following equation is satisfied:

$$|(\text{meanIdleTime}-\text{currentIdleTime})|>((2*\text{idleThreshold})+\text{meanUseTime}+\text{bufferTime}) \tag{EQ5}$$

If equation EQ5 is satisfied, then, in step 309, connection manager 205 disassociates managed connection 203 from its connection handles 204 and releases managed connection 203 to a free pool (i.e., a pool of managed connections 203 available to be used to represent another physical connection to the underlying EIS).

If, however, EQ5 is not satisfied, then, in step 313, connection manager 205 reduces the previous value of n by 0.1 and determines if equation EQ4 is satisfied in step 311.

Referring to step 311, if equation EQ4 is not satisfied, then method 300 is terminated in step 314.

In this manner, managed connections 203 are dissociated and released to a pool of managed connections 203 based on their usage patterns, determined by various connection parameters discussed above, which more effectively reduces the idle time of managed connections 203. Managed connections 203 whose cost of disassociating and reassociating is less than the cost of keeping the managed connection 203 idle are targeted and released to the free pool via dissociation from its connection handles 204.

In some implementations, method 300 may include other and/or additional steps that, for clarity, are not depicted. Further, in some implementations, method 300 may be executed in a different order presented and that the order presented in the discussion of FIGS. 3A-3C is illustrative. Additionally, in some implementations, certain steps in method 300 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for disassociating and freeing managed connection objects, the method comprising:
   determining an amount of time a managed connection has been idled;
   determining an average amount of time that said managed connection is in an idle state;

computing a standard deviation of a number of accesses to a physical connection represented by said managed connection over a time said managed connection has been idled; and disassociating, by a connection manager of an application server whose instructions are executed by a processor, said managed connection from a connection handle in response to said amount of time said managed connection has been idled being less than or greater than said standard deviation from said average time said managed connection is in said idle state and in response to said amount of time said managed connection has been idled being greater than said average time said managed connection is in said idle state, wherein said connection handle is used by an application to refer to said physical connection represented by said managed connection.

2. The method as recited in claim 1 further comprising:
computing a parameter to estimate a cost of dissociating and reassociating said managed connection from said connection handle.

3. The method as recited in claim 2, wherein said parameter is equal to:

$$2*(average(dissociate\ time+reassociate\ time)),$$

wherein said dissociate time is a time to dissociate said managed connection from said connection handle, wherein said reassociate time is a time to reassociate said managed connection with a subsequent physical connection.

4. The method as recited in claim 3 further comprising:
computing an average amount of time said managed connection is in use; and
computing a time for timing variations in dissociating and reassociating said managed connection.

5. The method as recited in claim 4 further comprising:
disassociating said managed connection from said connection handle in response to said amount of time said managed connection has been idled being less than or greater than said standard deviation from said average time said managed connection is in said idle state and in response to (meanIdleTime−currentIdleTime)>((2*idleThreshold)+meanUseTime+bufferTime), wherein said meanIdleTime is said average time said managed connection is in said idle state, wherein said currentIdleTime is said amount of time said managed connection has been idled, wherein said idleThreshold is equal to said parameter, wherein said meanUseTime is said average amount of time said managed connection is in use, wherein said bufferTime is said time for timing variations in dissociating and reassociating said managed connection.

6. The method as recited in claim 4 further comprising:
disassociating said managed connection from said connection handle in response to ((2*idleThreshold)+meanUseTime+bufferTime)<(1*n*SD) and in response to |(meanIdleTime−currentIdleTime)|>((2*idleThreshold)+meanUseTime+bufferTime), wherein said idleThreshold is equal to said parameter, wherein said meanUseTime is said average amount of time said managed connection is in use, wherein said bufferTime is said time for timing variations in dissociating and reassociating said managed connection, wherein said n is an integer initialized to a value of one, wherein said SD is equal to said standard deviation.

7. The method as recited in claim 6, wherein said n is reduced by a value of 0.1 in response to ((2*idleThreshold)+meanUseTime+bufferTime)<(1*n*SD) and in response to |(meanIdleTime−currentIdleTime)|≤((2*idleThreshold)+meanUseTime+bufferTime).

8. A computer program product embodied in a computer readable storage medium for disassociating and freeing managed connection objects, the computer program product comprising the programming instructions for:
determining an amount of time a managed connection has been idled;
determining an average amount of time that said managed connection is in an idle state;
computing a standard deviation of a number of accesses to a physical connection represented by said managed connection over a time said managed connection has been idled; and
disassociating said managed connection from a connection handle in response to said amount of time said managed connection has been idled being less than or greater than said standard deviation from said average time said managed connection is in said idle state and in response to said amount of time said managed connection has been idled being greater than said average time said managed connection is in said idle state, wherein said connection handle is used by an application to refer to said physical connection represented by said managed connection.

9. The computer program product as recited in claim 8 further comprising the programming instructions for:
computing a parameter to estimate a cost of dissociating and reassociating said managed connection from said connection handle.

10. The computer program product as recited in claim 9, wherein said parameter is equal to:

$$2*(average(dissociate\ time+reassociate\ time)),$$

wherein said dissociate time is a time to dissociate said managed connection from said connection handle, wherein said reassociate time is a time to reassociate said managed connection with a subsequent physical connection.

11. The computer program product as recited in claim 10 further comprising the programming instructions for:
computing an average amount of time said managed connection is in use; and
computing a time for timing variations in dissociating and reassociating said managed connection.

12. The computer program product as recited in claim 11 further comprising the programming instructions for:
disassociating said managed connection from said connection handle in response to said amount of time said managed connection has been idled being less than or greater than said standard deviation from said average time said managed connection is in said idle state and in response to (meanIdleTime−currentIdleTime)>((2*idleThreshold)+meanUseTime+bufferTime), wherein said meanIdleTime is said average time said managed connection is in said idle state, wherein said currentIdleTime is said amount of time said managed connection has been idled, wherein said idleThreshold is equal to said parameter, wherein said meanUseTime is said average amount of time said managed connection is in use, wherein said bufferTime is said time for timing variations in releasing said managed connection.

13. The computer program product as recited in claim 11 further comprising the programming instructions for:
disassociating said managed connection from said connection handle in response to ((2*idleThreshold)+meanUseTime+bufferTime)<(1*n*SD) and in response to

|(meanIdleTime−currentIdleTime)|>((2*idleThreshold)+meanUseTime+bufferTime)), wherein said idleThreshold is equal to said parameter, wherein said meanUseTime is said average amount of time said managed connection is in use, wherein said bufferTime is said time for timing variations in releasing said managed connection, wherein said n is an integer initialized to a value of one, wherein said SD is equal to said standard deviation.

14. The computer program product as recited in claim 13, wherein said n is reduced by a value of 0.1 in response to ((2*idleThreshold)+meanUseTime+bufferTime)<(1*n*SD) and in response to |(meanIdleTime−currentIdleTime)|≤((2*idleThreshold)+meanUseTime+bufferTime)).

15. A system, comprising:
a memory unit for storing a computer program for disassociating and freeing managed connection objects; and
a processor coupled to said memory unit, wherein said processor, responsive to said computer program, comprises:
 circuitry for determining an amount of time a managed connection has been idled;
 circuitry for determining an average amount of time that said managed connection is in an idle state;
 circuitry for computing a standard deviation of a number of accesses to a physical connection represented by said managed connection over a time said managed connection has been idled; and
 circuitry for disassociating, by a connection manager of an application server whose instructions are executed by a processor, said managed connection from a connection handle in response to said amount of time said managed connection has been idled being less than or greater than said standard deviation from said average time said managed connection is in said idle state and in response to said amount of time said managed connection has been idled being greater than said average time said managed connection is in said idle state, wherein said connection handle is used by an application to refer to said physical connection represented by said managed connection.

16. The system as recited in claim 15, wherein said processor further comprises:
 circuitry for computing a parameter to estimate a cost of dissociating and reassociating said managed connection from said connection handle.

17. The system as recited in claim 16, wherein said parameter is equal to:

$$2*(\text{average}(\text{dissociate time}+\text{reassociate time})),$$

wherein said dissociate time is a time to dissociate said managed connection from said connection handle, wherein said reassociate time is a time to reassociate said managed connection with a subsequent physical connection.

18. The system as recited in claim 17, wherein said processor further comprises:
 circuitry for computing an average amount of time said managed connection is in use; and
 circuitry for computing a time for timing variations in dissociating and reassociating said managed connection.

19. The system as recited in claim 18, wherein said processor further comprises:
 circuitry for disassociating said managed connection from said connection handle in response to said amount of time said managed connection has been idled being less than or greater than said standard deviation from said average time said managed connection is in said idle state and in response to (meanIdleTime−currentIdleTime)>((2*idleThreshold)+meanUseTime+bufferTime), wherein said meanIdleTime is said average time said managed connection is in said idle state, wherein said currentIdleTime is said amount of time said managed connection has been idled, wherein said idleThreshold is equal to said parameter, wherein said meanUseTime is said average amount of time said managed connection has been in use, wherein said bufferTime is said time for timing variations in releasing said managed connection.

20. The system as recited in claim 18, wherein said processor further comprises:
 circuitry for disassociating said managed connection from said connection handle in response to ((2*idleThreshold)+meanUseTime+bufferTime)<(1*n*SD) and in response to |(meanIdleTime−currentIdleTime)|>((2*idleThreshold)+meanUseTime+bufferTime)),
 wherein said idleThreshold is equal to said parameter, wherein said meanUseTime is said average amount of time said managed connection is in use, wherein said bufferTime is said time for timing variations in releasing said managed connection, wherein said n is an integer initialized to a value of one, wherein said SD is equal to said standard deviation.

21. The system as recited in claim 20, wherein said n is reduced by a value of 0.1 in response to ((2*idleThreshold)+meanUseTime+bufferTime)<(1*n*SD) and in response to |(meanIdleTime−currentIdleTime)|≤((2*idleThreshold)+meanUseTime+bufferTime)).

* * * * *